United States Patent
Wey et al.

(10) Patent No.: US 9,191,677 B2
(45) Date of Patent: Nov. 17, 2015

(54) METHOD AND APPARATUS FOR ENCODING IMAGE AND METHOD AND APPARTUS FOR DECODING IMAGE

(75) Inventors: Ho Cheon Wey, Seoul (KR); Seok Lee, Hwaseong-si (KR); Seung Sin Lee, Yongin-si (KR); Jae Joon Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 540 days.

(21) Appl. No.: 13/561,362

(22) Filed: Jul. 30, 2012

(65) Prior Publication Data

US 2013/0108181 A1    May 2, 2013

(30) Foreign Application Priority Data

Oct. 28, 2011   (KR) .................. 10-2011-0110992

(51) Int. Cl.
*G06K 9/46* (2006.01)
*H04N 19/30* (2014.01)
*H04N 19/597* (2014.01)

(52) U.S. Cl.
CPC ............. *H04N 19/30* (2014.11); *H04N 19/597* (2014.11)

(58) Field of Classification Search
None
See application file for complete search history.

(56) References Cited

U.S. PATENT DOCUMENTS

| | | | |
|---|---|---|---|
| 8,446,958 B2 * | 5/2013 | Kashiwagi et al. | 375/240.16 |
| 8,750,632 B2 * | 6/2014 | Nakamura et al. | 382/232 |
| 2005/0169543 A1 * | 8/2005 | Damera-Venkata | 382/236 |
| 2011/0134214 A1 | 6/2011 | Chen et al. | |
| 2011/0216833 A1 * | 9/2011 | Chen et al. | 375/240.16 |
| 2011/0242278 A1 * | 10/2011 | Yang et al. | 348/43 |
| 2011/0298895 A1 * | 12/2011 | Tian et al. | 348/46 |
| 2012/0050264 A1 * | 3/2012 | Karaoguz et al. | 345/419 |
| 2012/0075436 A1 * | 3/2012 | Chen et al. | 348/51 |
| 2012/0117133 A1 * | 5/2012 | Henry et al. | 708/203 |
| 2012/0183066 A1 * | 7/2012 | Oh et al. | 375/240.13 |
| 2013/0108181 A1 * | 5/2013 | Wey et al. | 382/233 |
| 2013/0127844 A1 * | 5/2013 | Koeppel et al. | 345/419 |

FOREIGN PATENT DOCUMENTS

| | | |
|---|---|---|
| KR | 10-2006-0092824 | 8/2006 |
| KR | 10-2008-0037593 | 4/2008 |
| KR | 10-2009-0109284 | 10/2009 |
| KR | 10-2010-0040708 | 4/2010 |
| KR | 10-2011-0039537 | 4/2011 |
| KR | 10-2011-0088334 | 8/2011 |
| KR | 10-2011-0088515 | 8/2011 |

(Continued)

OTHER PUBLICATIONS

Berenger et al Muscade Multi-media scalable 3D for Europe EADS Astrium 2010.*

(Continued)

*Primary Examiner* — Sean Motsinger
(74) *Attorney, Agent, or Firm* — Staas & Halsey LLP

(57) ABSTRACT

A method and apparatus for encoding an image, and a method and apparatus for decoding an image are provided. In the image encoding method, an input image may be encoded hierarchically based on a unified image compression format, irrespective of whether the input image corresponds to a two-dimensional (2D) image, a stereo image, or a three-dimensional (3D) image. An encoded bit stream generated through the encoding may be transmitted to the image decoding apparatus.

35 Claims, 10 Drawing Sheets

(56) References Cited

FOREIGN PATENT DOCUMENTS

| WO | WO 2008/051041 | 5/2008 |
| WO | WO 2010/126608 | 11/2010 |

OTHER PUBLICATIONS

Vetro et al Overview of the Stereo and Multiview video coding extensions of the H.264/Mpeg-4 AVC standard IEEE 2011.*

Zinger et al "Free viewpoint depth image based rendering" 2010.*

Extended Search Report dated Apr. 5, 2013 from European Patent Application No. 1219017937.

Aljoscha Smolic et al., "An Overview of Available and Emerging 3D Video Formats and Depth Enhanced Stereo as Efficient Generic Solution", Picture Coding Symposium, 2009. PCS 2009, IEEE, Piscataway, NJ, USA, May 6 2009, pp. 1-4, XP031491633, ISBN: 978-1-4244-4593-6.

Heiko Schwarz et al., "Description of 3D Video Technology Proposal by Fraunhofer HHI (HEVC compatible; configuration A)", 98. MPEG Meeting; Nov. 28, 2011-Dec. 2, 2011; Geneva, (Motion Picture Expert Group or ISO/IEC JTC1/SC29/WG11), No. m22570, Nov. 22, 2011, XP030051133, pp. 1-46.

\* cited by examiner

METHOD AND APPARATUS FOR ENCODING IMAGE AND METHOD AND APPARTUS FOR DECODING IMAGE

CROSS-REFERENCE TO RELATED APPLICATIONS

This application claims the priority benefit of Korean Patent Application No. 10-2011-0110992, filed on Oct. 28, 2011, in the Korean Intellectual Property Office, the disclosure of which is incorporated herein by reference.

BACKGROUND

1. Field

Embodiments relate to a technology for encoding and decoding a two-dimensional (2D) image, a stereo image, and a three-dimensional (3D) image so that a restored image may be reproduced irrespective of a type of an image reproducing apparatus.

2. Description of the Related Art

In manner different from a two-dimensional (2D) image, a three-dimensional (3D) image provides an image having a better sense of reality by providing a depth of an image to a user. Generally, a 3D image system refers to a system that provides a 3D image using an image having viewpoints greater than viewpoints of a stereoscopic image. That is, the 3D image system refers to a system that reproduces a multi-view image having viewpoints greater than viewpoints of a stereo image.

The 3D image system converts a color image received from a plurality of multiview cameras, a depth image, and additional information in a predetermined format to store the color image, the depth image, and the additional information. In this instance, the 3D image system compresses a 2D image, a stereo image, and a 3D image using different image compressing technologies, and transmits the compressed images to an image reproducing apparatus. Thus, a compression format varies depending on a type of image.

A 2D image reproducing apparatus reproduces the 2D image only, however, fails to reproduce the stereo image and the 3D image. A stereoscopic image reproducing apparatus of a polarizing filter type, a liquid crystal shutter type, or the like reproduces the stereo image corresponding to a stereoscopic image, however, fails to reproduce the 3D image.

Accordingly, there is a need for a signal processing technology for reproducing an image by making the image compatible, irrespective of a type of image and a type of image reproducing apparatus. That is, there is a desire for a technology for reproducing a restored image using any of a 2D image reproducing apparatus, a stereoscopic image reproducing apparatus, and an auto-stereoscopic 3D image reproducing apparatus, by processing a 2D image, a stereo image, and a 3D image identically regardless of a type of image.

SUMMARY

According to an aspect of one or more embodiments, there is provided a method of encoding an image, the method including assigning at least one view image included in an input image to at least one of a base layer, a stereo layer, a multi-view enhancement layer, and a multi-view extension layer, and hierarchically encoding the at least one view image assigned to at least one of the base layer, the stereo layer, the multi-view enhancement layer, and the multi-view extension layer.

The encoding may include encoding, through inter-view prediction, a neighboring image assigned to the stereo layer, in view of a reference image assigned to the base layer.

The encoding may include encoding, through intra prediction, a depth image of a reference image assigned to the multi-view enhancement layer, and encoding, through inter-view prediction, a depth image of a neighboring image assigned to the multi-view enhancement layer.

The encoding may include encoding, through inter-view prediction, a view image assigned to the multi-view enhancement layer, in view of at least one of a reference image assigned to the base layer and a neighboring image assigned to the stereo layer.

The encoding may include encoding, through inter-view prediction, a depth image of a view image assigned to the multi-view extension layer, in view of at least one of a depth image of a reference image assigned to the multi-view enhancement layer and a depth image of a neighboring image assigned to the multi-view enhancement layer.

The encoding may include converting a resolution of at least one of a reference image assigned to the base layer and a neighboring image assigned to the stereo layer, based on a resolution of a view image assigned to the multi-view extension layer, and encoding the view image assigned to the multi-view extension layer, in view of at least one of the reference image and the neighboring image of which the resolution may be converted.

The encoding may include converting a resolution of at least one of a depth image of a reference image and a depth image of a neighboring image that may be assigned to the multi-view enhancement layer, based on a resolution of a depth image of a view image assigned to the multi-view extension layer, and encoding the view image assigned to the multi-view extension layer, in view of at least one of the depth image of the reference image and the depth image of the neighboring image of which the resolution may be converted.

A neighboring image assigned to the stereo layer may have a resolution identical to a resolution of a reference image assigned to the base layer.

A depth image of a reference image assigned to the multi-view enhancement layer may have a resolution identical to or different from a resolution of a depth image of a reference image, and a resolution of a depth image of a neighboring image. A depth image of a neighboring image assigned to the multi-view enhancement layer may have a resolution identical to or different from a resolution of a reference image, and a resolution of a neighboring image.

A view image assigned to the multi-view extension layer may have a resolution identical to or different from a resolution of a reference image, and a resolution of a neighboring image, and a depth image of the view image assigned to the multi-view extension layer may have a resolution identical to or different from a resolution of a depth image of a reference image, and a resolution of a depth image of a neighboring image.

The assigning may include assigning, to the base layer, a reference image corresponding to a first view image, assigning, to the stereo layer, a neighboring image that may neighbor the reference image and may correspond to a second view image, assigning, to the multi-view enhancement layer, a depth image of the reference image and a depth image of the neighboring image, and assigning, to the multi-view extension layer, a remaining neighboring image, excluding the neighboring image from images neighboring the reference image, and a depth image corresponding to the remaining neighboring image. Here, the remaining neighboring image may correspond to at least one image having a view different from views of the first view image and the second view image.

The encoding may include generating, through the encoding, an encoded hierarchical bit stream including a base layer stream, a stereo layer stream, a multi-view enhancement layer stream, and a multi-view extension layer stream.

The assigning of the at least one view image may be based on at least one of image resolution information, number of view images to be included in encoded bit stream, camera parameter information, and image mode information According to an aspect of one or more embodiments, there is provided an apparatus for encoding an image, the apparatus including a layer assigning unit to assign at least one view image included in an input image to at least one of a base layer, a stereo layer, a multi-view enhancement layer, and a multi-view extension layer, and an encoding unit to hierarchically encode the at least one view image assigned to at least one of the base layer, the stereo layer, the multi-view enhancement layer, and the multi-view extension layer.

The encoding unit may encode, through inter-view prediction, a neighboring image assigned to the stereo layer, in view of a reference image assigned to the base layer.

The encoding unit may encode, through intra prediction, a depth image of a reference image assigned to the multi-view enhancement layer, and may encode, through inter-view prediction, a depth image of a neighboring image assigned to the multi-view enhancement layer.

The encoding unit may encode, through inter-view prediction, a view image assigned to the multi-view enhancement layer, in view of at least one of a reference image assigned to the base layer and a neighboring image assigned to the stereo layer.

The encoding unit may encode, through inter-view prediction, a depth image of a view image assigned to the multi-view extension layer, in view of at least one of a depth image of a reference image assigned to the multi-view enhancement layer and a depth image of a neighboring image assigned to the multi-view enhancement layer.

The encoding unit may convert a resolution of at least one of a reference image assigned to the base layer and a neighboring image assigned to the stereo layer, based on a resolution of a view image assigned to the multi-view extension layer. The encoding unit may encode the view image assigned to the multi-view extension layer, in view of at least one of the reference image and the neighboring image of which the resolution may be converted.

The encoding unit may convert a resolution of at least one of a depth image of a reference image and a depth image of a neighboring image that may be assigned to the multi-view enhancement layer, based on a resolution of a depth image of a view image assigned to the multi-view extension layer. The encoding unit may encode the view image assigned to the multi-view extension layer, in view of at least one of the depth image of the reference image and the depth image of the neighboring image of which the resolution may be converted.

The layer assigning unit may assign the at least one view image based on at least one of image resolution information, number of view images to be included in encoded bit stream, camera parameter information, and image mode information According to an aspect of one or more embodiments, there is provided a method of decoding an image, the method including receiving an encoded bit stream including a base layer stream, a stereo layer stream, a multi-view enhancement layer stream, and a multi-view extension layer stream, and hierarchically decoding the encoded bit stream based on additional information.

The decoding may include restoring a two-dimensional (2D) image by decoding the base layer stream based on the additional information.

The decoding may include restoring a reference image and a neighboring image by decoding the base layer stream and the stereo layer stream.

The decoding may include generating a depth image of the reference image and a depth image of the neighboring image in view of at least one of the reference image and the neighboring image, generating at least one virtual view image in view of the reference image and the neighboring image, generating a depth image of the at least one virtual view image in view of the depth image of the reference image and the depth image of the neighboring image, and generating a multi-view image by synthesizing the reference image, the neighboring image, the depth image of the reference image, the depth image of the neighboring image, the at least one virtual view image, and the depth image of the at least one virtual view image.

The decoding may include restoring a depth image of the reference image and a depth image of the neighboring image by decoding the multi-view enhancement layer stream, generating at least one virtual view image in view of the reference image and the neighboring image, generating a depth image of the at least one virtual view image in view of the depth image of the reference image and the depth image of the neighboring depth image, and generating a multi-view image by synthesizing the reference image, the neighboring image, the depth image of the reference image, the depth image of the neighboring image, the at least one virtual view image, and the depth image of the at least one virtual view image.

The decoding may include restoring a depth image of the reference image and a depth image of the neighboring image by decoding the multi-view enhancement layer stream, restoring at least one view image assigned to a multi-view extension layer, and a depth image of the at least one view image by decoding the multi-view extension layer stream, and generating a multi-view image by synthesizing the reference image, the neighboring image, the depth image of the reference image, the depth image of the neighboring image, the at least one view image assigned to the multi-view extension layer, and the depth image of the at least one view image assigned to the multi-view extension layer.

According to an aspect of one or more embodiments, there is provided an apparatus for decoding an image, the apparatus including a bit stream receiving unit to receive an encoded hierarchical bit stream including a base layer stream, a stereo layer stream, a multi-view enhancement layer stream, and a multi-view extension layer stream, and a decoding unit to hierarchically decode the encoded bit stream based on additional information.

The decoding unit may include a 2D decoding unit to restore a 2D image by decoding the base layer stream based on the additional information.

The decoding unit may include a stereo decoding unit to restore a reference image and a neighboring image by decoding the base layer stream and the stereo layer stream when the additional information included in the encoded bit stream includes a stereo image mode.

The apparatus may further include a depth image generating unit to generate a depth image of the reference image and a depth image of the neighboring image in view of at least one of the reference image and the neighboring image, and a view image synthesizing unit to generate at least one virtual view image in view of the reference image and the neighboring image, to generate a depth image of the at least one virtual view image in view of the depth image of the reference image and the depth image of the neighboring image, and to restore a multi-view image by synthesizing the reference image, the neighboring image, the depth image of the reference image, the depth image of the neighboring image, the at least one virtual view image, and the depth image of the at least one virtual view image.

The decoding unit may include a three-dimensional (3D) decoding unit to restore a reference image and a neighboring image by decoding the base layer stream and the stereo layer stream, and to restore a depth image of the reference image and a depth image of the neighboring image by decoding the multi-view enhancement layer stream.

In this instance, the apparatus may further include a view image synthesizing unit to generate at least one virtual view image in view of the reference image and the neighboring image, to generate a depth image of the at least one virtual view image in view of the depth image of the reference image and the depth image of the neighboring image, and to restore a multi-view image by synthesizing the reference image, the neighboring image, the depth image of the reference image, the depth image of the neighboring image, the at least one virtual view image, and the depth image of the at least one virtual view image.

The decoding unit may include a 3D decoding unit to restore a reference image and a neighboring image by decoding the base layer stream and the stereo layer stream, to restore a depth image of the reference image and a depth image of the neighboring image by decoding the multi-view enhancement layer stream, and to restore at least one view image assigned to a multi-view extension layer, and a depth image of the at least one view image by decoding the multi-view extension layer stream when the additional information included in the encoded bit stream includes a multi-view image mode.

In this instance, the apparatus may further include a view image synthesizing unit to generate a multi-view image by synthesizing the reference image, the neighboring image, the depth image of the reference image, the depth image of the neighboring image, the at least one view image, and the depth image of the at least one view image.

The example embodiments may include a method and apparatus that may provide a unified image compression format, irrespective of a type of image and a type of image reproducing apparatus, by encoding and decoding an input image hierarchically.

The example embodiments may also include a method and apparatus providing compatibility with both a conventional 2D image reproducing apparatus and a stereo image reproducing apparatus, in reproducing a 2D image having a view selected among a multiview image, by providing a unified image compression format irrespective of a type of image.

According to another aspect of one or more embodiments, there is provided at least one non-transitory computer readable medium storing computer readable instructions to implement methods of one or more embodiments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
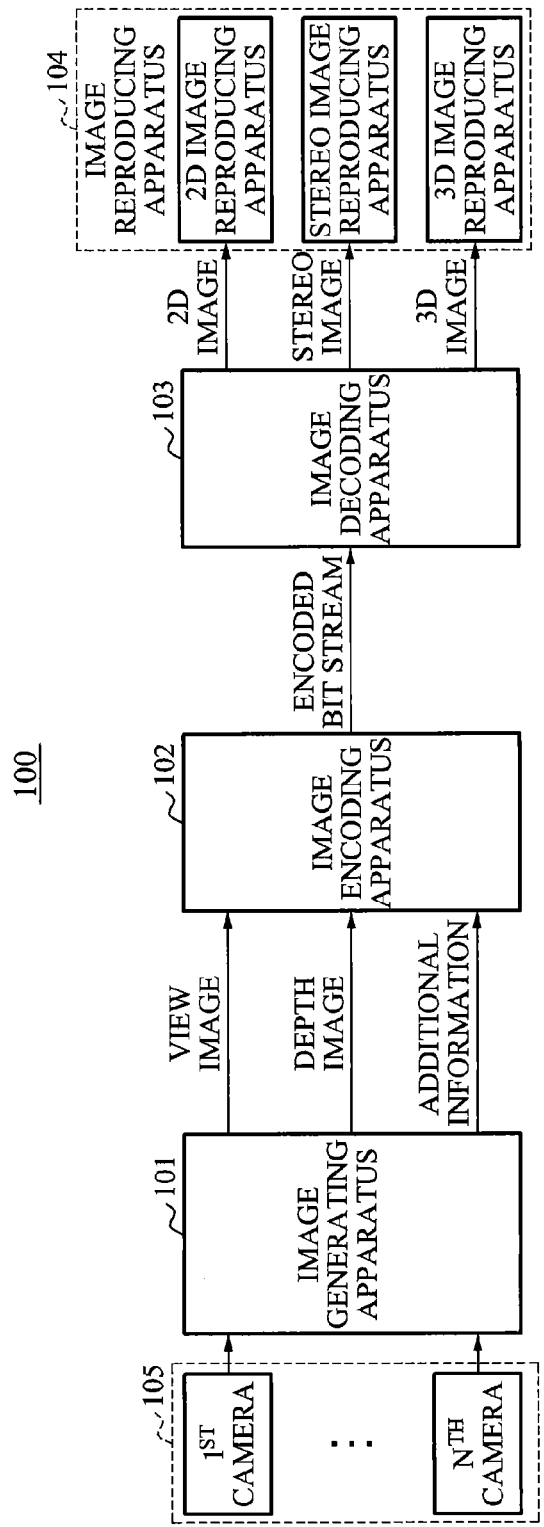
FIG. 1 illustrates a configuration of an image processing system according to embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of an image processing system 100 according to embodiments.

Referring to FIG. 1, the system 100 may include an image generating apparatus 101, an image encoding apparatus 102, an image decoding apparatus 103, and an image reproducing apparatus 104. For example, the image reproducing apparatus 104 may include a two-dimensional (2D) image reproducing apparatus, a stereo image reproducing apparatus, and a three-dimensional (3D) image reproducing apparatus.

The image generating apparatus 101 may generate an input image based on a view image photographed using a plurality of cameras 105, a depth image, and additional information. Here, the input image may include a 2D image, a stereo image corresponding to a stereoscopic image, or a 3D image corresponding to a multiview image. The view image may correspond to a color image. In this instance, the plurality of cameras 105 may include at least one of a multiview camera, a visible band camera, an infrared camera, and a depth camera.

The image encoding apparatus 102 may generate an encoded bit stream by hierarchically encoding the 2D image, the stereo image, or the 3D image included in the input image. The image encoding apparatus 102 may transmit the encoded bit stream to the image decoding apparatus 103. The image decoding apparatus 103 may restore the 2D image, the stereo image, or the 3D image by hierarchically decoding the encoded bit stream. The image reproducing apparatus 104 may reproduce the restored image. In this instance, the image reproducing apparatus 104 may correspond to the 2D image reproducing apparatus, the stereo image reproducing apparatus, or the 3D image reproducing apparatus. That is, the image reproducing apparatus 104 may reproduce the restored image, irrespective of a type of image and a type of image reproducing apparatus.

Hereinafter, a process of providing a unified image compression format in order to reproduce a restored image irrespective of a type of image and a type of image reproducing apparatus, and a process of encoding and decoding an input image using the unified image compression format will be described in detail.

Figure 2:
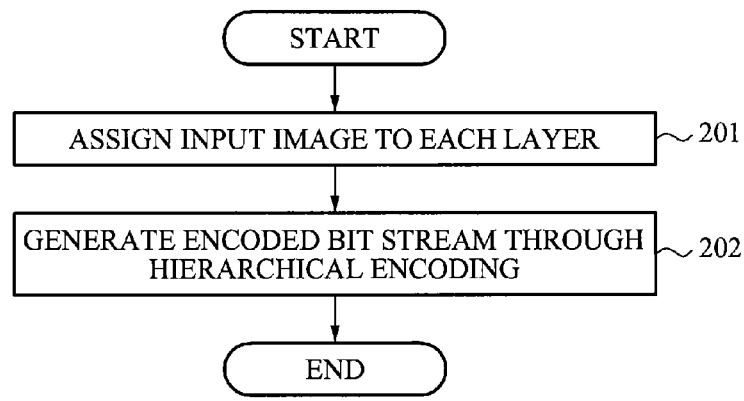
FIG. 2 illustrates an operation of hierarchically encoding an input image based on a unified image compression format according to embodiments.

FIG. 2 illustrates an operation of hierarchically encoding an input image based on a unified image compression format according to embodiments.

Figure 10:
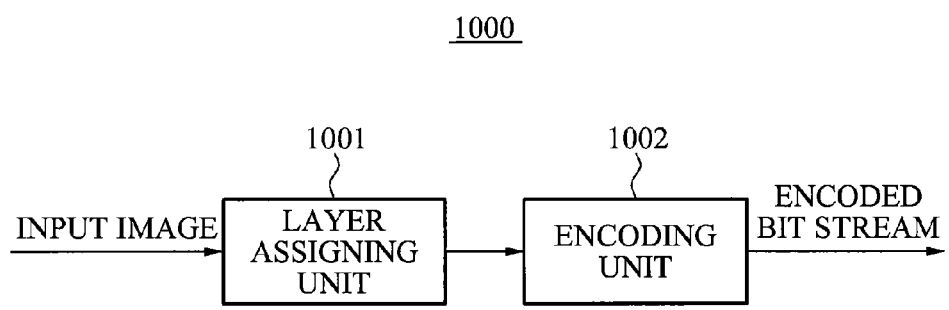
FIG. 10 illustrates a configuration of an apparatus for encoding an image according to embodiments.

In FIG. 2, the encoding operation may be performed by an image encoding apparatus 1000 of FIG. 10.

In operation 201, the image encoding apparatus 1000 may assign an input image to each layer based on additional information.

Here, the additional information may include at least one of resolution information, information about a number of view images that may indicate a number of view images included in an encoded bit stream, camera parameter information, and image mode information. For example, the resolution information may include at least one of resolution information of a view image, and resolution information of a depth image. The camera parameter information may include 3D spatial coordinates of a view image. The image mode information may include mode information indicating which of a 2D image, a stereo image, and a 3D image the input image may correspond to.

In this instance, the image encoding apparatus 1000 may assign the input image to at least one of a base layer, a stereo layer, a multi-view enhancement layer, and a multi-view extension layer. Here, the input image may include a 2D image, a stereo image, or a 3D image.

The 2D image may include one view image including a color and color information. The stereo image may include two view images including a color and color information. The 3D image may include at least three view images including a color and color information, and depth images corresponding to the at least three view images. For example, the stereo image may include a stereoscopic image including a left image and a right image, and the 3D image may include a multiview image.

In operation 202, the image encoding apparatus 1000 may generate an encoded bit stream by hierarchically encoding the image assigned to each layer. The image encoding apparatus 1000 may transmit the encoded bit stream to an image decoding apparatus. In this instance, the image encoding apparatus 1000 may hierarchically encode the input image in order starting from a base layer, a stereo layer, a multi-view enhancement layer, and a multi-view extension layer, depending on which of the 2D image, the stereo image, and the 3D image the input image may correspond to.

As an example, when the input image corresponds to a 2D image, the image encoding apparatus 1000 may assign the 2D image to the base layer. That is, since the 2D image may include one view image, the image encoding apparatus 1000 may assign the one view image to the base layer, and may generate an encoded bit stream by encoding the view image assigned to the base layer.

In this instance, the image encoding apparatus 1000 may set image mode information to a 2D image mode since the input image corresponds to the 2D image. The image encoding apparatus 1000 may transmit the encoded bit stream to the image decoding apparatus by inserting additional information including the image mode information into the encoded bit stream.

As another example, when the input image corresponds to a stereo image, the image encoding apparatus 1000 may assign a reference image included in the stereo image to the base layer, and may assign, to the stereo layer, a neighboring image corresponding to the other image, excluding the reference image from the stereo image. The image encoding apparatus 1000 may generate an encoded bit stream by encoding the view images assigned to the base layer and the stereo layer. Here, the reference image may refer to an image of which image information may correspond only to information necessary for image restoration, without referring to other view images.

In this instance, the image encoding apparatus 1000 may set image mode information to a stereo image mode since the input image corresponds to the 2D image. The image encoding apparatus 1000 may transmit the encoded bit stream to the image decoding apparatus by inserting additional information including the image mode information into the encoded bit stream. Here, when the input image corresponds to the stereo image, the additional information may further include camera parameter information, resolution information, and information about a number of view images. For example, the information about a number of view images of the stereo image may correspond to 2 since the stereo image may include two view images.

As still another example, when the input image corresponds to a 3D image including two view images and two depth images, the image encoding apparatus 1000 may assign, between the two view images, a reference image to the base layer, and a neighboring image to the stereo layer. The image encoding apparatus 1000 may assign a depth image corresponding to the reference image and a depth image corresponding to the neighboring image to the multi-view enhancement layer. The image encoding apparatus 1000 may generate an encoded bit stream by encoding the images assigned to each layer in order starting from the base layer, the stereo layer, and the multi-view enhancement layer.

In this instance, the image encoding apparatus 1000 may set image mode information to a 3D image mode since the input image corresponds to the 3D image. The image encoding apparatus 1000 may transmit the encoded bit stream to the image decoding apparatus by inserting additional information including the image mode information into the encoded bit stream. Here, when the input image corresponds to the 3D image, the additional information may further include camera parameter information, resolution information, and information about a number of view images. For example, when the 3D image includes two view images and two depth images, the information about a number of view images may correspond to 2.

As yet another example, when the input image corresponds to a 3D image including at least three view images and at least three depth images, the image encoding apparatus 1000 may assign, among the at least three view images, a reference image to the base layer, and one neighboring image neighboring the reference image to the stereo layer. The image encoding apparatus 1000 may assign a depth image corresponding to the reference image and a depth image corresponding to the neighboring image to the multi-view enhancement layer. Also, the image encoding apparatus 1000 may assign, to the multi-view extension layer, a remaining view image, excluding the reference image and the neighboring image from the at least three view images, and a depth image corresponding to the remaining view image. The image encoding apparatus 1000 may generate an encoded bit stream by encoding the images assigned to each layer in order starting from the base layer, the stereo layer, the multi-view enhancement layer, and the multi-view extension layer.

In this instance, the image encoding apparatus 1000 may set image mode information to a 3D image mode since the input image corresponds to the 3D image. The image encoding apparatus 1000 may transmit the encoded bit stream to the image decoding apparatus by inserting additional information including the image mode information into the encoded bit stream. Here, when the input image corresponds to the 3D image, the additional information may further include camera parameter information, resolution information, and information about a number of view images. For example, when the 3D image includes at least three view images and at least three depth images, the information about a number of view images may correspond to a value greater than 3.

Figure 3:
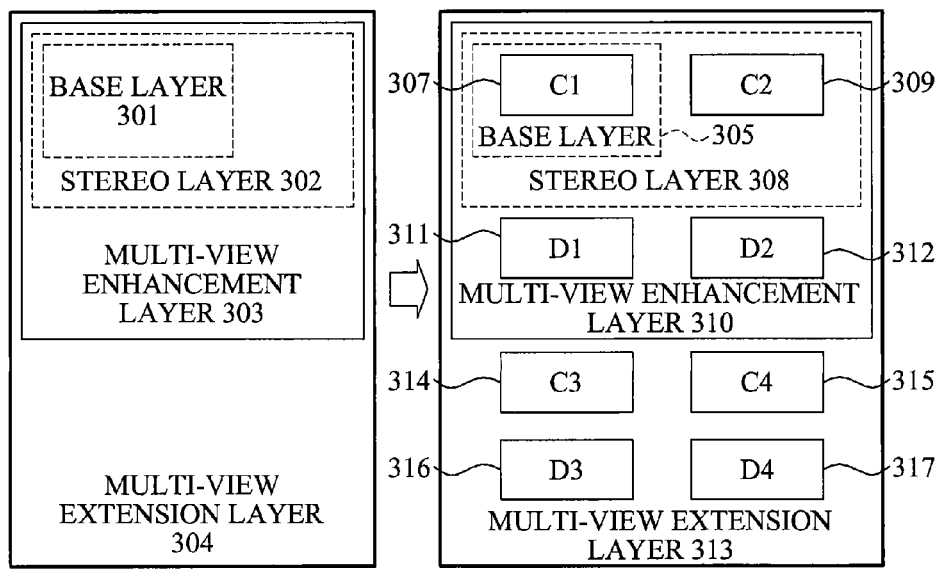
FIG. 3 illustrates a unified image compression format according to embodiments.

FIG. 3 illustrates a unified image compression format according to embodiments.

Referring to FIG. 3, the unified image compression format may include a base layer 301, a stereo layer 302, a multi-view enhancement layer 303, and a multi-view extension layer 304. An image encoding apparatus may assign an input image to each layer based on additional information.

In FIG. 3, the base layer 301 may correspond to a layer in which an image, corresponding to a criterion for encoding the input image, may be positioned. The stereo layer 302 may correspond to a layer in which one neighboring image, among at least one view image neighboring the reference image, may be positioned. For example, when a left image of a stereo image is positioned in the base layer 301, a right image may be positioned in the stereo layer 302. Conversely, when the right image of the stereo image is positioned in the base layer 301, the left image may be positioned in the stereo layer 302.

The multi-view enhancement layer 303 may correspond to a layer in which a depth image corresponding to the reference image and a depth image corresponding to the neighboring image may be positioned. When the input image corresponds to a multiview image including at least three view images, a remaining view image, excluding the view images positioned in the base layer 301 and the stereo layer 302, and a depth image corresponding to the remaining view image may be positioned in the multi-view extension layer 304.

Figure 4:
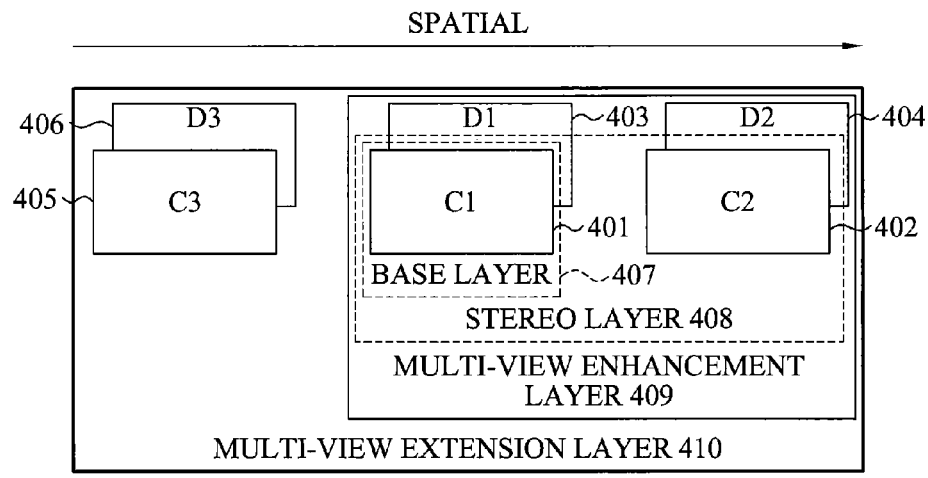
FIG. 4 illustrates a unified image compression format formed by assigning three view images to each layer according to embodiments.

As an example, referring to FIG. 4, when the input image corresponds to a 3D image including three view images and three depth images, the image encoding apparatus may determine one of the three view images to be a reference image. Here, the reference image may refer to an image of which image information may correspond only to the information necessary for image restoration, without referring to other view images. For example, when a view image C1 401, among three view images C1 401, C2 402, and C3 405, is restorable through intra prediction, the image encoding apparatus may determine the view image C1 401 to be a reference image. Here, the reference image may be referred to as a key frame as well.

The image encoding apparatus may determine one of at least one view image neighboring the reference image to be a neighboring image. That is, referring to FIG. 4, the image encoding apparatus may determine the view image C2 402 to be the neighboring image. In this instance, a resolution of the neighboring image may be identical to a resolution of the reference image. For example, the image encoding apparatus may determine, among the at least one view image neighboring the reference image, one view image having a resolution identical to a resolution of the reference image to be the neighboring image.

The image encoding apparatus may assign, to a base layer 407, the view image C1 401 that is determined to be the reference image, and may assign, to a stereo layer 408, the view image C2 402 that is determined to be the neighboring image. The image encoding apparatus may assign, to a multi-view enhancement layer 409, a depth image D1 403 corresponding to the reference image and a depth image D2 404 corresponding to the neighboring image. The image encoding apparatus may assign, to a multi-view extension layer 410, the remaining view image C3 405, excluding the view image C1 401 corresponding to the reference image and the view image C2 402 corresponding to the neighboring image from the three view images C1 401, C2 402, and C3 405, and a depth image D3 406 corresponding to the view image C3 405.

As another example, referring again to FIG. 3, when the input image corresponds to a 3D image including four view images and four depth images, the image encoding apparatus may assign, to a base layer 305, a view image C1 307 determined to be a reference image, and may assign, to a stereo layer 308, a view image C2 309 determined to be a neighboring image. Here, a resolution of the view image C2 309 assigned to the stereo layer 308 may be identical to a resolution of the view image C1 307 assigned to the base layer 305. The image encoding apparatus may assign, to a multi-view enhancement layer 310, a depth image D1 311 corresponding to the view image C1 307 and a depth image D2 312 corresponding to the view image C2 309. The image encoding apparatus may assign, to a multi-view extension layer 313, remaining view images C3 314 and C4 315, excluding the view image C1 307 corresponding to the reference image and the view image C2 309 corresponding to the neighboring image from the four view images, a depth image D3 316 corresponding to the view image C3 314, and a depth image D4 317 corresponding to the view image C4 315. In this instance, a resolution of each of the view images C3 314 and C4 315 assigned to the multi-view extension layer 313 may be identical to or different from a resolution of the reference image and a resolution of the neighboring image. Similarly, a resolution of each of the depth images D3 316 and D4 317 assigned to the multi-view extension layer 313 may be identical to or different from the resolution of the reference image and the resolution of the neighboring image. For example, the resolution of each of the view image C3 314, the view image C4 315, the depth image D3 316, and the depth image D4 317 may be less than or equal to the resolution of the reference image and the resolution of the neighboring image.

Figure 5:
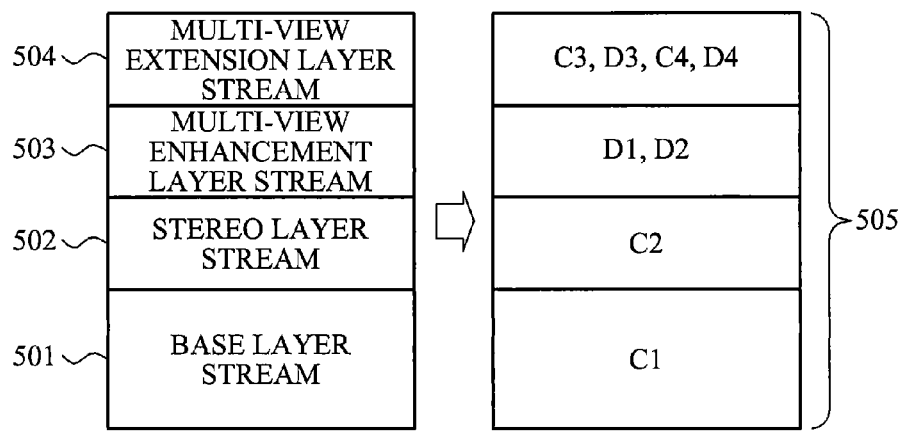
FIG. 5 illustrates a configuration of an encoded bit stream generated through hierarchical encoding according to embodiments.

FIG. 5 illustrates a configuration of an encoded bit stream generated through hierarchical encoding according to embodiments.

Referring to FIG. 5, the encoded bit stream 505 may include a base layer stream 501, a stereo layer stream 502, a multi-view enhancement layer stream 503, and a multi-view extension layer stream 504. Here, the base layer stream 501 may correspond to a stream in which a reference image may be encoded. The stereo layer stream 502 may correspond to a stream in which a neighboring image may be encoded. The multi-view enhancement layer stream 503 may correspond to a stream in which a depth image corresponding to the reference image and a depth image corresponding to the neighboring image may be encoded. The multi-view extension stream 504 may correspond to a stream in which a remaining view image, excluding the reference image and the neighboring image from view images included in an input image, and a depth image corresponding to the remaining view image may be encoded.

For example, when the input image corresponds to a 3D image including four view images C1 to C4 and four depth images D1 to D4, an encoded view image C1 may be included in the base layer stream 501, an encoded view image C2 may be included in the stereo layer stream 502, encoded depth images D1 and D2 may be included in the multi-view enhancement layer stream 503, and encoded view images C3 and C4 and depth images D3 and D4 may be included in the multi-view extension layer stream 504.

Hereinafter, a process of hierarchically encoding at least one of a view image and a depth image assigned to each layer of a unified image compression format will be described in detail.

Figure 6:
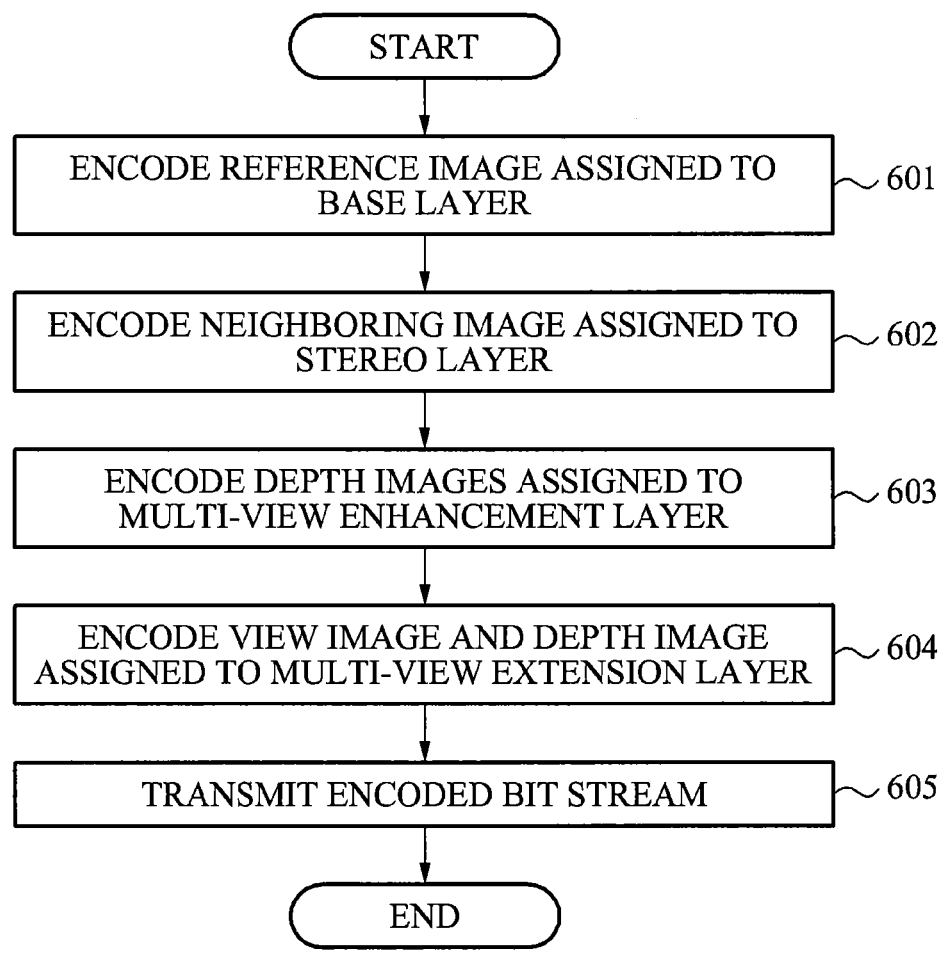
FIG. 6 illustrates an operation of hierarchically encoding an image assigned to each layer according to embodiments.

FIG. 6 illustrates an operation of hierarchically encoding an image assigned to each layer according to embodiments.

In FIG. 6, the encoding operation may be performed by the image encoding apparatus 1000 of FIG. 10. An operation of hierarchically encoding an image assigned to each layer in a case in which an input image may correspond to a 3D image including three view images and three depth images, as illustrated in FIG. 4, will be described with reference to FIG. 6.

In operation 601, the image encoding apparatus 1000 may encode a reference image assigned to a base layer. In this instance, the image encoding apparatus 1000 may encode, through intra prediction, the reference image based on a spatial axis. The image encoding apparatus 1000 may encode the reference image in view of at least one of previous images based on a temporal axis. Here, the previous images may refer to images positioned earlier than a reference image in a time series, based on a current time.

In operation 602, the image encoding apparatus 1000 may encode a neighboring image assigned to a stereo layer. Here, a resolution of the neighboring image may be identical to a resolution of the reference image. The neighboring image may correspond to one of images neighboring the reference image.

In this instance, the image encoding apparatus 1000 may encode, through inter-view prediction, the neighboring image in view of the reference image assigned to the base layer based on the spatial axis. Here, the encoding through inter-view prediction may be referred to as encoding through inter prediction. The image encoding apparatus 1000 may encode the neighboring image in view of at least one of previous images of the neighboring images based on the temporal axis.

In operation 603, the image encoding apparatus 1000 may encode a depth image assigned to a multi-view enhancement layer. In this instance, the image encoding apparatus 1000 may encode, through intra prediction, a depth image corresponding to the reference image based on the spatial axis. The image encoding apparatus 1000 may encode a depth image corresponding to the neighboring image in view of the depth image of the reference image, which may correspond to a depth image positioned at the same time with the depth image corresponding to the neighboring image based on the spatial axis. The image encoding apparatus 1000 may encode the depth image corresponding to the reference image, in view of previous images of the depth image, based on the temporal axis, and may encode depth images corresponding to previous images, in view of the previous images of the depth image corresponding to the neighboring image.

In operation 604, the image encoding apparatus 1000 may encode a view image and a depth image assigned to a multi-view extension layer.

In this instance, the image encoding apparatus 1000 may perform encoding through inter-view prediction in view of at least one view image positioned at the same time as the view image assigned to the multi-view extension layer based on the spatial axis. The image encoding apparatus 1000 may encode the view image assigned to the multi-view extension layer in view of previous images of the view image assigned to the multi-view extension layer based on the temporal axis. The image encoding apparatus 1000 may perform encoding through inter-view prediction in view of at least one depth image positioned at the same time as the depth image assigned to the multi-view extension layer based on the spatial axis. The image encoding apparatus 1000 may encode the depth image assigned to the multi-view extension layer in view of the depth image of the neighboring image assigned to the multi-view extension layer based on the temporal axis.

In operation 605, the image encoding apparatus 1000 may transmit an encoded bit stream including the base layer, the stereo layer, the multi-view enhancement layer, and the multi-view extension layer.

Figure 7:
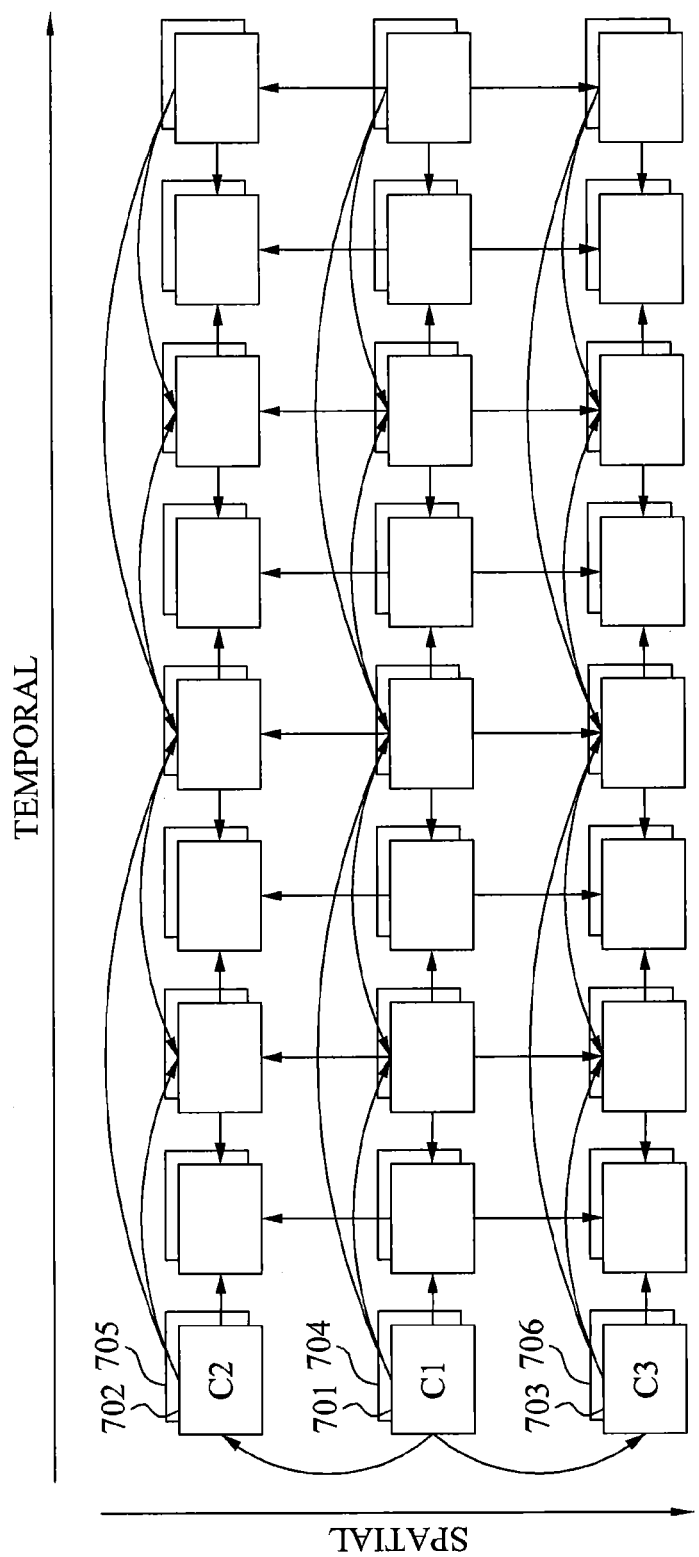
FIG. 7 illustrates a process of hierarchically encoding a three-dimensional (3D) image including three view images and depth images according to embodiments.

FIG. 7 illustrates a process of hierarchically encoding a 3D image including three view images and three depth images according to embodiments.

Referring to FIG. 7, when a view image C1 701, among three view images, is determined to be a reference image, an image encoding apparatus may encode, through intra prediction, the reference image C1 701 assigned to a base layer based on a spatial axis, and may encode the reference image C1 701 in view of previous images of the reference image C1 701 based on a temporal axis.

When a view image C2 702, among view images C2 702 and C3 703 neighboring the reference image C1 701, is determined to be a neighboring image, and assigned to a stereo layer, the image encoding apparatus may encode, through inter-view prediction, the neighboring image C2 702 in view of at least one view image positioned at the same time as the neighboring image C2 702 based on the spatial axis. The image encoding apparatus may encode the neighboring image C2 702 in view of previous images of the neighboring image C2 702 based on the temporal axis.

For example, the image encoding apparatus may encode the neighboring image C2 702 in view of the reference image C1 701 based on the spatial axis. The image encoding apparatus may encode the neighboring image C2 702 in view of a view image C3 703 based on the spatial axis. Also, the image encoding apparatus may encode the neighboring image C2 702 in view of the view images C1 701 and C3 703 based on the spatial axis.

The image encoding apparatus may encode, through intra prediction, a depth image D1 704 of the reference image C1 701 assigned to a multi-view enhancement layer based on the spatial axis. The image encoding apparatus may encode the depth image D1 704 in view of previous images of the depth image D1 704 based on the temporal axis. The image encoding apparatus may encode, through inter-view prediction, a depth image D2 705 of the neighboring image C2 702 in view of at least one of the depth image D1 704 and a depth image D3 706 based on the spatial axis. The image encoding apparatus may encode the depth image D2 705 in view of previous images of the depth image D2 705 based on the temporal axis.

The image encoding apparatus may encode the view image C3 703 and the depth image D3 706 assigned to a multi-view extension layer, in an identical manner by which the neighboring image C2 705 may be encoded.

For example, the image encoding apparatus may encode, through inter-view prediction, the view image C3 703 in view of at least one of the reference image C1 701 and the neighboring image C2 702 based on the spatial axis. The image encoding apparatus may encode the view image C3 703 in view of previous images of the view image C3 703 based on the temporal axis. The image encoding apparatus may encode, through inter-view prediction, the depth image D3 706 in view of at least one of the depth images D1 704 and D2 705 based on the spatial axis. The image encoding apparatus may encode the depth image D3 706 in view of previous images of the depth image D3 706 based on the temporal axis.

Figure 8:
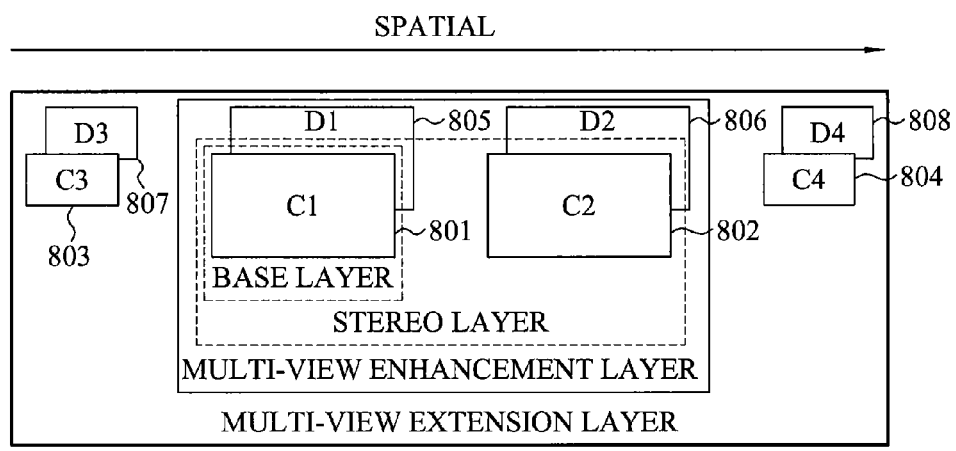
FIG. 8 illustrates a configuration in which a 3D image including four view images and four depth images may be assigned to each layer according to embodiments.

FIG. 8 illustrates a configuration in which a 3D image including four view images and four depth images may be assigned to each layer according to embodiments.

Figure 9:
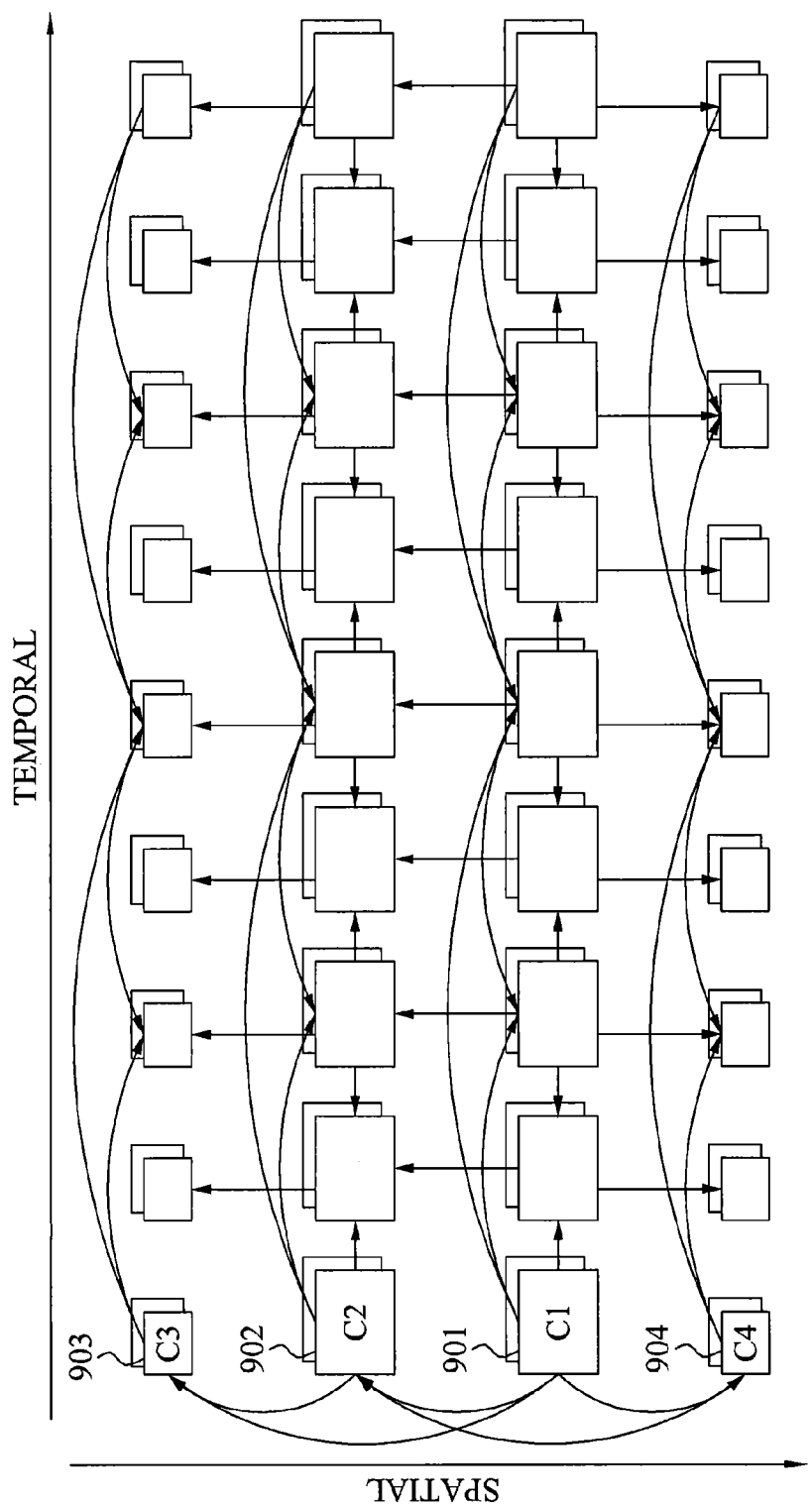
FIG. 9 illustrates a process of hierarchically encoding a 3D image through resolution conversion according to embodiments.

FIG. 9 illustrates a process of hierarchically encoding a 3D image through resolution conversion according to embodiments.

In FIGS. 8 and 9, an input image may correspond to a 3D image including four view images and four depth images.

Referring to FIG. 8, when a view image C1 801, among the four view images, is determined to be a reference image, an image encoding apparatus may encode, through intra prediction, the reference image C1 801 assigned to a base layer based on a spatial axis, and may encode the reference image C1 801 in view of previous images of the reference image C1 801 based on a temporal axis.

When a view image C2 802, among view images C2 802, C3 803, and C4 804 neighboring the reference image C1 801, is determined to be a neighboring image, and assigned to a stereo layer, the image encoding apparatus may encode, through inter-view prediction, the neighboring image C2 802 in view of at least one view point positioned at the same time as the neighboring image C2 802 based on the spatial axis.

As an example, the image encoding apparatus may encode the neighboring image C2 802 in view of at least one of the view images C1 801, C3 803, and C4 804 based on the spatial axis. For example, referring to FIG. 9, the image encoding apparatus may encode a view image C2 902 in view of a view image C1 901 based on a spatial axis. The image encoding apparatus may encode the view image C2 902 in view of a view image C3 903 based on the spatial axis. The image encoding apparatus may encode the view image C2 902 in view of a view image C4 904 based on the spatial axis. The image encoding apparatus may encode the view image C2 902 in view of the view images C1 901 and C3 903 based on the spatial axis. The image encoding apparatus may encode the view image C2 902 in view of the view images C1 901 and C4 904 based on the spatial axis. The image encoding apparatus may encode the view image C2 902 in view of the view images C3 903 and C4 904. Also, the image encoding apparatus may encode the view image C2 902 in view of the view images C1 901, C3 903, and C4 904 based on the spatial axis.

Referring again to FIG. 8, the image encoding apparatus may encode the neighboring image C2 802 in view of previous images of the neighboring image C2 802 based on the temporal axis. Here, a resolution of the neighboring image C2 802 may be identical to a resolution of the reference image C1 801. A resolution of the view image C3 803 or C4 804 may be identical to or different from a resolution of the neighboring image C2 802 and the resolution of the reference image C1 801.

The image encoding apparatus may encode, through intra prediction, a depth image D1 805 of the reference image C1 801 assigned to a multi-view enhancement layer based on the spatial axis. The image encoding apparatus may encode the depth image D1 805 in view of previous images of the depth image D1 805 based on the temporal axis. The image encoding apparatus may encode, through inter-view prediction, a depth image D2 806 of the neighboring image C2 802 in view of the depth image D1 805 based on the spatial axis. The image encoding apparatus may encode the depth image D2 806 in view of previous images of the depth image D2 806 based on the temporal axis.

The image encoding apparatus may encode the view images C3 803 and C4 804, and the depth images D3 807 and D4 808 assigned to a multi-view extension layer.

As an example, the image encoding apparatus may convert a resolution of the reference image C1 801 to be identical to a resolution of the view image C3 803, by down-scaling the reference image C1 801. The image encoding apparatus may encode, through inter-view prediction, the view image C3 803 in view of the reference image C1 801 of which the resolution may be converted.

As another example, the image encoding apparatus may convert a resolution of the neighboring image C2 802 to be identical to the resolution of the view image C3 803. The image encoding apparatus may encode, through inter-view prediction, the view image C3 803 in view of the neighboring image C2 802 of which the resolution may be converted.

As still another example, the image encoding apparatus may convert the resolutions of the reference image C1 801 and the neighboring image C2 802 to be identical to the resolution of the view image C3 803. The image encoding apparatus may encode, through inter-view prediction, the view image C3 803 in view of the reference image C1 801 and the neighboring image C2 802 of which the resolutions may be converted.

As yet another example, the image encoding apparatus may convert the resolutions of the reference image C1 801 and the neighboring image C2 802 to be identical to the resolution of the view image C3 803. The image encoding apparatus may encode, through inter-view prediction, the view image C3 803 in view of at least one of the view image C3 803, and the reference image C1 801 and the neighboring image C2 802 of which the resolutions may be converted.

The image encoding apparatus may encode the view image C3 803 in view of previous images of the view image C3 803 based on the temporal axis.

The image encoding apparatus may encode, through inter-view prediction, the view image C4 804, in an identical manner by which the view image C3 803 may be encoded. For example, the image encoding apparatus may convert the resolution of at least one of the reference image C1 801 and the neighboring image C2 802 to be identical to a resolution of the view image C4 804. The image encoding apparatus may encode, through inter-view prediction, the view image C4 804 in view of at least one of the view image C3 803, and the reference image C1 801 and the neighboring image C2 802 of which the resolutions may be converted. The image encoding apparatus may encode the view image C4 804 in view of previous images of the view image C4 804 based on the temporal axis.

Similarly, the image encoding apparatus may encode, through inter-view prediction, the depth images D3 807 and D4 808 based on the spatial axis.

As an example, the image encoding apparatus may convert a resolution of at least one of the depth images D1 805 and D2 806 to be identical to a resolution of the depth image D3 807. The image encoding apparatus may encode, through inter-view prediction, the depth image D3 807 in view of at least one of the depth image D4 808, and the depth images D1 805 and D2 806 of which the resolutions may be converted. The image encoding apparatus may encode the depth image D3 807 in view of previous images of the depth image D3 807 based on the temporal axis.

As another example, the image encoding apparatus may convert the resolution of at least one of the depth images D1 805 and D2 806 to be identical to a resolution of the depth image D4 808. The image encoding apparatus may encode, through inter-view prediction, the depth image D4 808 in view of at least one of the depth image D3 807, and the depth images D1 805 and D2 806 of which the resolutions may be converted. The image encoding apparatus may encode the depth image D4 808 in view of previous images of the depth image D4 808 based on the temporal axis.

FIG. 10 illustrates a configuration of the image encoding apparatus 1000 for encoding an image according to embodiments.

Referring to FIG. 10, the image encoding apparatus 1000 may include a layer assigning unit 1001, and an encoding unit 1002.

The layer assigning unit 1001 may assign an input image to at least one of a base layer, a stereo layer, a multi-view enhancement layer, and a multi-view extension layer, based on additional information. Here, the additional information may include at least one of resolution information, information about a number of view images that may indicate a number of view images included in an encoded bit stream, camera parameter information, and image mode information.

As an example, when the input image corresponds to a 2D image, the layer assigning unit 1001 may assign the 2D image to the base layer. The encoding unit 1002 may generate an encoded bit stream by encoding the 2D image assigned to the base layer, using an image encoding scheme, for example, H.264/AVC, HEVC, and the like. For example, the encoding unit 1002 may encode, through intra prediction, the 2D image based on a spatial axis, and may generate an encoded bit stream by encoding the 2D image in view of previous images based on a temporal axis.

In this instance, the encoding unit 1002 may set image mode information to a 2D image mode, and may transmit the encoded bit stream to an image decoding apparatus by inserting additional information including the image mode information into the encoded bit stream.

As another example, when the input image corresponds to a stereo image, the layer assigning unit 1001 may determine one of two view images to be a reference image, and may determine a remaining view image, excluding the reference image, to be a neighboring image. Here, the reference image may refer to an image of which image information may correspond only to the information necessary for image restoration, without referring to other view images. The layer assigning unit 1001 may assign the reference image to the base layer, and may assign the neighboring image to the stereo layer. In this instance, a resolution of the view image assigned to the base layer may be identical to a resolution of the view image assigned to the stereo layer.

The encoding unit 1002 may generate an encoded bit stream, by hierarchically encoding the images, in order, starting from the base layer and the stereo layer. For example, the encoding unit 1002 may encode, through intra prediction, the reference image assigned to the base layer based on the spatial axis, and may encode a 2D image in view of previous images based on the temporal axis. The encoding unit 1002 may encode, through inter-view prediction, the neighboring image in view of the reference image corresponding to a view image positioned at the same time as the neighboring image assigned to the stereo layer based on the spatial axis. In this instance, the encoding unit 1002 may set image mode information to a stereo image mode, and may transmit the encoded bit stream to the image decoding apparatus by inserting additional information including the image mode information into the encoded bit stream.

As still another example, when the input image corresponds to a 3D image including two view images and two depth images, the layer assigning unit 1001 may determine one of the two images to be a reference image, and may determine a remaining image, excluding the reference image, to be a neighboring image. The layer assigning unit 1001 may assign the reference image to the base layer, and may assign the neighboring image to the stereo layer. The layer assigning unit 1001 may assign a depth image corresponding to the reference image and a depth image corresponding to the neighboring image to the multi-view enhancement layer.

The encoding unit 1002 may generate an encoded bit stream, by hierarchically encoding the images, in order, starting from the base layer, the stereo layer, and the multi-view enhancement layer. For example, the encoding unit 1002 may encode, through intra prediction, the depth image of the reference image assigned to the multi-view enhancement layer based on the spatial axis, and may generate a multi-view enhancement layer stream by encoding the depth image of the reference image in view of previous images based on the temporal axis. Here, an operation of encoding the view images assigned to the base layer and the stereo layer is identical to the operation of encoding the stereo image and thus, duplicated descriptions will be omitted for conciseness.

In this instance, the encoding unit 1002 may set image mode information to a 3D image mode, and may transmit the encoded bit stream to the image decoding apparatus by inserting additional information including the image mode information into the encoded bit stream.

As yet another example, when the input image corresponds to a 3D image including at least three view images and at least three depth images, the layer assigning unit 1001 may determine one of the at least three view images to be a reference image, and may determine one of view images neighboring the reference image to be a neighboring image. In this instance, a resolution of the neighboring image may be identical to a resolution of the reference image. The layer assigning unit 1001 may assign the reference image to the base layer, and may assign the neighboring image to the stereo layer. The layer assigning unit 1001 may assign a depth image corresponding to the reference image and a depth image corresponding to the neighboring image to the multi-view enhancement layer. Also, the layer assigning unit 1001 may assign, to the multi-view extension layer, a remaining view image, excluding the reference image and the neighboring image from the at least three view images, and a remaining depth image, excluding the depth image of the reference image, and the depth image of the neighboring image from the at least three depth images.

The encoding unit 1002 may generate an encoded bit stream by hierarchically encoding the images, in order starting from the base layer, the stereo layer, the multi-view enhancement layer, and the multi-view extension layer.

For example, the encoding unit 1002 may encode, through inter-view prediction, a view image assigned to the multi-view extension layer, in view of at least one of the reference image assigned to the base layer and the neighboring image assigned to the stereo layer based on the spatial axis. The encoding unit 1002 may encode the view image assigned to the multi-view extension layer, in view of previous images of the view image assigned to the multi-view extension layer based on the temporal axis. Also, the encoding unit 1002 may encode, through inter-view prediction, a depth image of the view image assigned to the multi-view extension layer, in view of at least one of a depth image of a reference image and a depth image of a neighboring image that may be assigned to the multi-view enhancement layer.

In this instance, when a resolution of the view image assigned to the multi-view extension layer is different from a resolution of the reference image and a resolution of the neighboring image, the encoding unit 1002 may convert the resolution of at least one of the reference image and the neighboring image to be identical to the resolution of the view image assigned to the multi-view extension layer. The encoding unit 1002 may encode, through inter-view prediction, the view image assigned to the multi-view extension layer, in view of at least one of the reference image and the neighboring image of which the resolution may be converted.

Similarly, when a resolution of a depth image corresponding to the view image assigned to the multi-view extension layer is different from a resolution of a depth image of the reference image and a resolution of a depth image of the neighboring image, the encoding unit 1002 may convert the resolution of at least one of the depth image of the reference image and the depth image of the neighboring image to be identical to the resolution of the depth image corresponding to the view image assigned to the multi-view extension layer. The encoding unit 1002 may encode, through inter-view prediction, the depth image of the view image assigned to the multi-view extension layer, in view of at least one of the depth image of the reference image and the depth image of the neighboring image of which the resolution may be converted.

The encoding unit 1002 may set image mode information to a 3D image mode, and may transmit the encoded bit stream to the image decoding apparatus, by inserting additional information including the image mode information into the encoded bit stream.

In FIG. 10, the 2D image may include one view image including a color and color information. The stereo image may include two view images including a color and color information. The 3D image may include at least three view images including a color and color information, and depth images corresponding to the at least three view images. For example, the stereo image may include a stereoscopic image including a left image and a right image, and the 3D image may include a multiview image.

Figure 11:
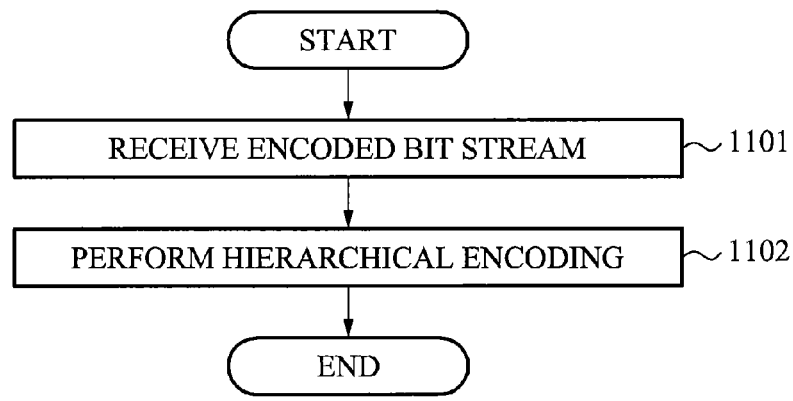
FIG. 11 illustrates an operation of decoding an encoded bit stream based on a unified image compression format according to embodiments.

FIG. 11 illustrates an operation of decoding an encoded bit stream based on a unified image compression format according to embodiments.

Figure 13:
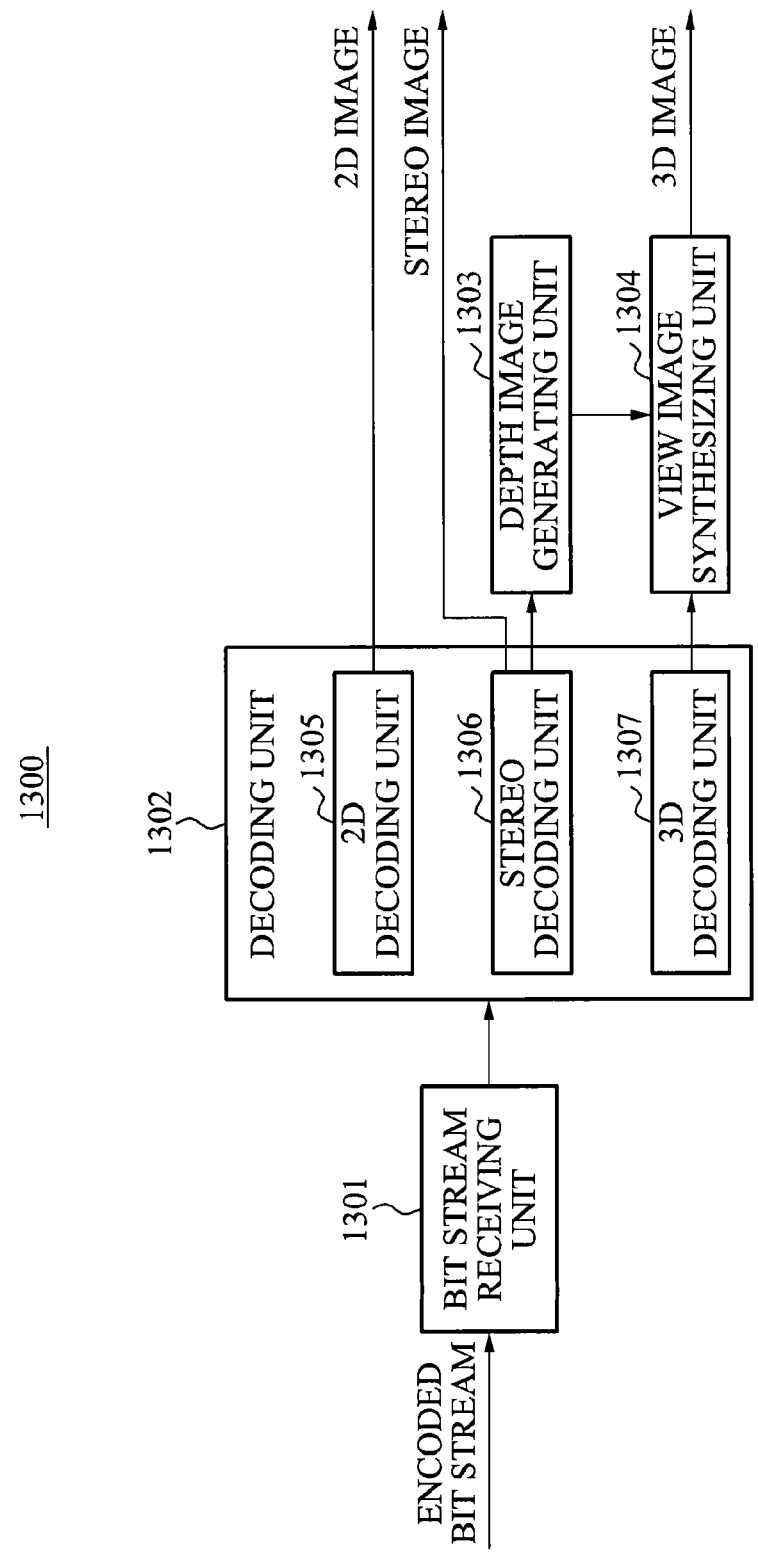
FIG. 13 illustrates a configuration of an apparatus for decoding an image according to embodiments.

In FIG. 11, the operation of decoding the encoded bit stream may be performed by an image decoding apparatus 1300 of FIG. 13.

In operation 1101, the image decoding apparatus 1300 may receive an encoded hierarchical bit stream from an image encoding apparatus. Here, the encoded bit stream may include a base layer stream, a stereo layer stream, a multi-view enhancement layer stream, and a multi-view extension layer stream.

In operation 1102, the image decoding apparatus 1300 may hierarchically decode the encoded bit stream based on additional information. Here, the additional information may include at least one of resolution information, information about a number of view images, camera parameter information, and image mode information.

For example, the image decoding apparatus 1300 may decode at least one of the base layer stream, the stereo layer stream, the multi-view enhancement layer stream, and the multi-view extension layer stream, based on which of a 2D image mode, a stereo image mode, and a 3D image mode the image mode information is set to.

Figure 12:
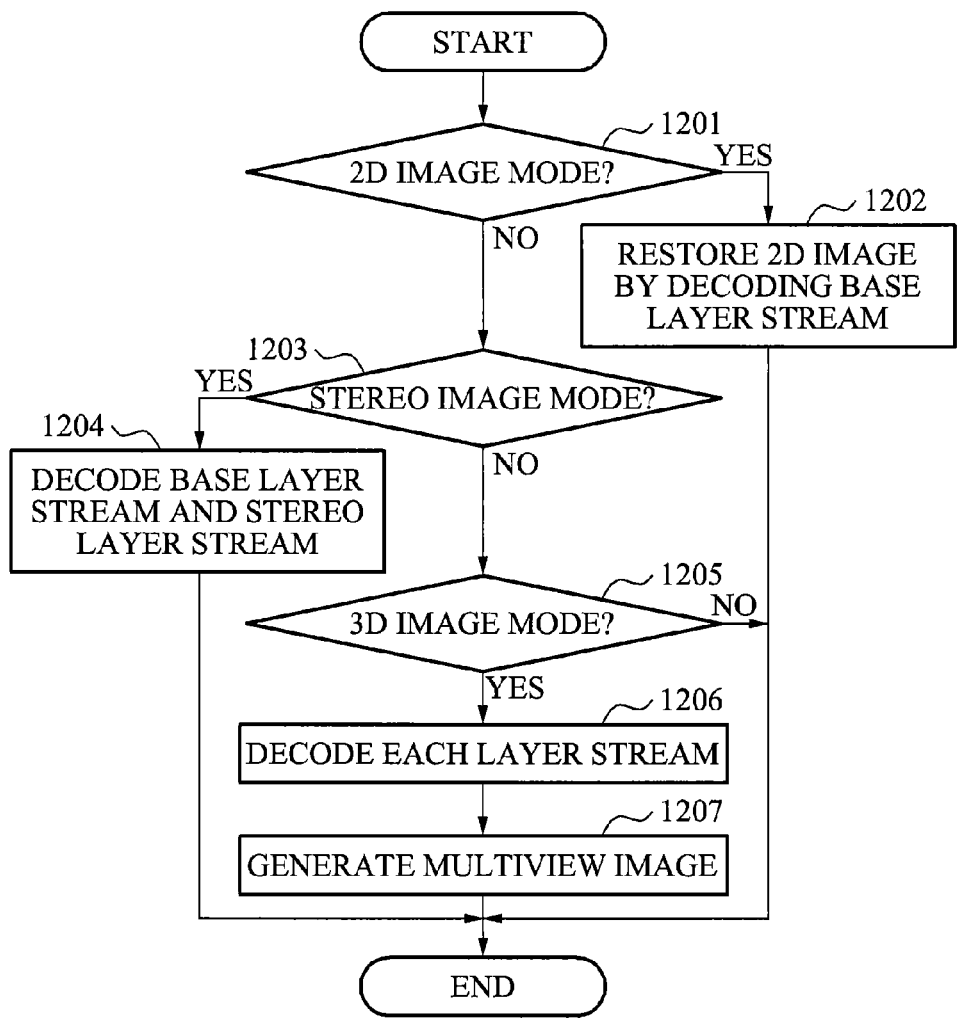
FIG. 12 illustrates an operation of hierarchically decoding an encoded bit stream based on image mode information according to embodiments.

FIG. 12 illustrates an operation of hierarchically decoding an encoded bit stream based on image mode information according to embodiments.

When the image mode information correspond to a 2D image mode in operation 1201, an image decoding apparatus may restore a 2D image by decoding the base layer stream only, in the encoded bit stream, in operation 1202. That is, the image decoding apparatus may decode the base layer stream only, rather than decoding all of the base layer stream, the stereo layer stream, the multi-view enhancement layer stream, and the multi-view extension layer stream, and may discard the other layer streams.

When the image mode information corresponds to a stereo image mode in operation 1203, the image decoding apparatus may restore a stereo image by decoding the base layer stream and the stereo layer stream, in operation 1204.

When the image mode information corresponds to a 3D image mode in operation 1205, the image decoding apparatus may restore a 3D image by decoding each layer stream, in operation 1206.

As an example, when an encoded bit stream, generated by encoding two view images, is received from an image encoding apparatus, and image mode information included in additional information is set to a 3D image mode, the image decoding apparatus may restore the two view images by decoding a base layer stream and a stereo layer stream. For example, the image decoding apparatus may restore a reference image and a neighboring image. The image decoding apparatus may generate depth images corresponding to the two view images, in view of at least one of the two view images. In this instance, the image decoding apparatus may generate the two depth images using a depth estimation algorithm or a disparity estimation algorithm. That is, the image decoding apparatus may generate a depth image of the reference image and a depth image of the neighboring image. In operation 1207, the image decoding apparatus may generate a multiview image by synthesizing the restored reference image, the restored neighboring image, the generated depth image of the reference image, and the generated depth image of the neighboring image.

As another example, when an encoded bit stream, generated by encoding two view images and two depth images, is received from the image encoding apparatus, and image mode information included in additional information is set to a 3D image mode, the image decoding apparatus may restore the two view images by decoding a base layer stream and a stereo layer stream, and may restore the two depth images by decoding a multi-view enhancement layer stream. That is, the image decoding apparatus may restore a reference image, a neighboring image, a depth image of the reference image, and a depth image of the neighboring image. The image decoding apparatus may generate at least one virtual view image using interpolation or extrapolation, based on the reference image and the neighboring image. In this instance, the image decoding apparatus may use the interpolation or the extrapolation based on a position of a virtual view image desired to be generated. For example, when the virtual view image desired to be generated is positioned between the reference image and the neighboring image, the image decoding apparatus may generate the virtual view image using the interpolation. When the virtual view image desired to be generated is not positioned between the reference image and the neighboring image, the image decoding apparatus may generate the virtual view image using the extrapolation.

Also, the image decoding apparatus may generate a depth image corresponding to the virtual view image using the interpolation or the extrapolation based on a depth image of the restored reference image and a depth image of the restored neighboring image. The image decoding apparatus may generate a multiview image by synthesizing the two restored view images and the two depth images, the at least one virtual view image generated, and the depth image corresponding to the at least one virtual view image.

As still another example, when an encoded bit stream, generated by encoding at least three view images and at least three depth images, is received from the image encoding apparatus, and image mode information included in additional information is set to a 3D image mode, the image decoding apparatus may restore two view images by decoding a base layer stream and a stereo layer stream, and may restore two depth images by decoding a multi-view enhancement layer stream. The image decoding apparatus may restore at least one view image and at least one depth image assigned to a multi-view extension layer, by decoding a multi-view extension layer stream. The image decoding apparatus may generate a multiview image by synthesizing the at least three restored view images and the at least three depth images.

As yet another example, when an encoded bit stream, generated by encoding at least three view images and at least three depth images, is received from the image encoding apparatus, and image mode information included in additional information is set to a 3D image mode, the image decoding apparatus may restore two view images by decoding a base layer stream and a stereo layer stream, and may restore two depth images by decoding a multi-view enhancement layer. The image decoding apparatus may restore a view image and a depth image assigned to a multi-view extension layer, by decoding a multi-view extension layer stream. The image decoding apparatus may generate at least one virtual view image using interpolation or extrapolation, based on at least two of the at least three view images restored.

Also, the image decoding apparatus may generate a depth image corresponding to the at least one virtual view image using the interpolation or the extrapolation, based on at least two of depth images corresponding to the at least three view images restored. The image decoding apparatus may generate a multiview image by synthesizing the two restored view images and the two depth images, the at least one virtual view image generated, and the depth image corresponding to the at least one virtual view image.

FIG. 13 illustrates a configuration of the image decoding apparatus 1300 for decoding an image according to embodiments.

Referring to FIG. 13, the image decoding apparatus 1300 may include a bit stream receiving unit 1301, a decoding unit 1302, a depth image generating unit 1303, and a view image synthesizing unit 1304.

The bit stream receiving unit 1301 may receive an encoded hierarchical bit stream from an image encoding apparatus. Here, the encoded bit stream may include a base layer stream, a stereo layer stream, a multi-view enhancement layer stream, and a multi-view extension layer stream.

The decoding unit 1302 may hierarchically decode the encoded bit stream based on additional information inserted in the encoded bit stream. Here, the additional information may include at least one of resolution information, information about a number of view images, camera parameter information, and image mode information.

In this instance, the decoding unit 1302 may include a 2D decoding unit 1305, a stereo decoding unit 1306, and a 3D decoding unit 1307.

When the image mode information corresponds to a 2D image mode, the 2D decoding unit 1305 may restore a 2D image by decoding the base layer stream. For example, the 2D decoding unit 1305 may decode the base layer stream, using an image decoding scheme, for example, H.264/AVC, HEVC, and the like. The restored 2D image may be reproduced by a 2D image reproducing apparatus.

When the image mode information corresponds to a stereo image mode, the stereo decoding unit 1306 may restore a stereo image by decoding the base layer stream and the stereo layer stream. Here, the stereo image may include two view images. In this instance, the stereo image may include a reference image C1 and a neighboring image C2. For example, the stereo decoding unit 1306 may decode the base layer stream and the stereo layer stream, using an image decoding scheme, for example, H.264/AVC, HEVC, and the like. The restored stereo image may be reproduced by a stereo image reproducing apparatus, for example, a stereoscopic reproducing apparatus.

In this instance, when the image mode information corresponds to a 3D image mode, the stereo decoding unit 1306 may restore a stereo image by decoding the base layer stream and the stereo layer stream. The depth image generating unit 1303 may generate a depth image of the reference image and a depth image of the neighboring image, in view of at least one of the restored reference image and the restored neighboring image. The view image synthesizing unit 1304 may generate a multiview image by synthesizing the restored reference image, the restored neighboring image, the generated depth image of the reference image, and the generated depth image of the neighboring image. The generated multiview image may be reproduced by an auto-stereoscopic reproducing apparatus.

When the image mode information corresponds to a 3D image mode, the 3D decoding unit 1307 may restore a reference image and a neighboring image by decoding the base layer stream and the stereo layer stream, and may restore a depth image of the reference image and a depth image of the neighboring image by decoding the multi-view enhancement layer stream. The view image synthesizing unit 1304 may generate at least one virtual view image using interpolation or extrapolation, based on the restored reference image and the restored neighboring image. The view image synthesizing unit 1304 may generate a depth image corresponding to the at least one virtual view image using the interpolation or the extrapolation, based on a depth image of the restored reference image and a depth image of the restored neighboring image. The view image synthesizing unit 1304 may generate a multiview image by synthesizing the reference image, the neighboring image, the depth image of the reference image, the depth image of the neighboring image, the at least one virtual view image, and the depth image of the at least one virtual view image.

When the image mode information corresponds to a 3D image, the 3D decoding unit 1307 may restore a reference image and a neighboring image by decoding the base layer stream and the stereo layer stream, and may restore a depth image of the reference image and a depth image of the neighboring image by decoding the multi-view enhancement layer stream. The 3D decoding unit 1307 may restore a view image assigned to a multi-view extension layer, and a depth image corresponding to the view image, by decoding the multi-view extension layer stream. The view image synthesizing unit 1304 may generate a multiview image by synthesizing the reference image, the neighboring image, the depth image of the reference image, the depth image of the neighboring image, the view image assigned to the multi-view extension layer, and the depth image of the view image.

In this instance, the view image synthesizing unit 1304 may generate at least one virtual view image using interpolation or extrapolation, based on at least two of the reference image, the neighboring image, and the view image assigned to the multi-view extension layer. Also, the view image synthesizing unit 1304 may generate a depth image corresponding to the at least one virtual view image using the interpolation or the extrapolation, based on at least two of the depth image of the reference image, the depth image of the neighboring image, and the depth image of the at least one virtual view image assigned to the multi-view extension layer. The view synthesizing unit 1304 may generate a multiview image by synthesizing the reference image, the neighboring image, the view image assigned to the multi-view extension layer, and the at least one virtual view image, the depth image of the reference image, the depth image of the neighboring image, the depth image of the view image assigned to the multi-view extension layer, and the depth image of the at least one virtual view image.

In FIGS. 12 and 13, when an encoded bit stream, generated by input an image of which a resolution may be converted, is received by the image decoding apparatus from the image encoding apparatus, the image decoding apparatus also may restore a resolution of a decoded image to an original resolution using resolution conversion.

As an example, an encoded bit stream, generated by encoding a 3D image including three view images and three depth images, is received from the image encoding apparatus, the decoding unit 1302 may convert a resolution of at least one of the restored reference image and the restored neighboring image, based on resolution information included in additional information. For example, the decoding unit 1302 may down-scale the resolution of at least one of the restored reference image and the restored neighboring image. The resolution of at least one of the restored reference image and the restored neighboring image may be converted to be identical to a resolution of the view image assigned to the multi-view extension layer in advance of the encoding.

The decoding unit 1302 may restore the view image assigned to the multi-view extension layer, in view of at least one of the reference image and the neighboring image of which the resolution may be converted. Also, the decoding unit 1302 may restore the depth image of the view image assigned to the multi-view extension layer, in view of at least one of the depth image of the reference image and the depth image of the neighboring image of which the resolution may be converted.

As another example, the image encoding apparatus may transmit the encoded bit stream to the image decoding apparatus 1300 by inserting resolution conversion information into the encoded bit stream. Here, the resolution conversion information may include at least one of a ratio by which at least one of the reference image and the neighboring image may be down-scaled, and a ratio by which at least one of the depth image of the reference image and the depth image of the neighboring image may be down-scaled.

The decoding unit 1302 may down-scales a resolution of at least one of the restored reference image and the restored neighboring image, based on the resolution conversion information. The decoding unit 1302 may restore the view image assigned to the multi-view extension layer, in view of at least one of the reference image and the neighboring image of which the resolution may be converted. Also, the decoding unit 1302 may down-scales a resolution of at least one of the depth image of the restored reference image and the depth image of the restored neighboring image, based on the resolution conversion information. The depth image of the view image assigned to the multi-view extension layer may be restored in view of at least one of the depth image of the reference image and the depth image of the neighboring image of which the resolution may be converted.

As aforementioned, an image encoding apparatus may transmit an encoded bit stream to an image decoding apparatus, by hierarchically encoding an input image based on a unified image compression format, and the image decoding apparatus may restore the input image by hierarchically decoding the encoded bit stream based on additional information. That is, irrespective of whether the input image corresponds to a 2D image, a stereo image, or a 3D image, the image encoding apparatus may encode the input image, and the image decoding apparatus may decode the encoded bit stream to restore the 2D image, the stereo image, or the 3D image. Accordingly, the image restored through encoding and decoding performed by the image encoding apparatus and the image decoding apparatus may be reproduced by all conventional apparatuses, for example, a 2D image reproducing apparatus, a stereo image reproducing apparatus, and a 3D image reproducing apparatus.

The methods according to the above-described embodiments may be recorded in non-transitory computer-readable media to store program instructions (computer-readable instructions) to implement various operations by executing program instruction to control one or more processors, which are part of a computer, a computing device, a computer system, or a network. The media may also store, alone or in combination with the program instructions, data files, data structures, and the like. Examples of program instructions include both machine code, such as produced by a compiler, and files containing higher level code that may be executed by the computer using an interpreter.

The non-transitory computer-readable media may also be embodied in at least one application specific integrated circuit (ASIC) or Field Programmable Gate Array (FPGA), which executes (processes like a processor) computer readable instructions. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The described hardware devices may be configured to act as one or more software modules in order to perform the operations of the above-described embodiments, or vice versa. Another example of non-transitory computer-readable media may also be a distributed network, so that the computer readable instructions are stored and executed in a distributed fashion.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of encoding an image, the method comprising:
    assigning at least one view image included in an input image to at least one of a base layer, a stereo layer, a multi-view enhancement layer, and a multi-view extension layer; and
    hierarchically encoding the at least one view image assigned to at least one of the base layer, the stereo layer, the multi-view enhancement layer, and the multi-view extension layer using at least one processor,
    wherein the encoding comprises converting a resolution of at least one of a reference image, a neighboring image, a depth image of a reference image, and a depth image of a neighboring image, based on at least one of a resolution of the at least one view image and a resolution of a depth image of the at least one view image, and encoding the at least one view image based on the at least one image of which the resolution is converted.

2. The method of claim 1, wherein the encoding comprises encoding, through inter-view prediction, a neighboring image assigned to the stereo layer, in view of a reference image assigned to the base layer, wherein the neighboring image neighbors the reference image.

3. The method of claim 1, wherein the encoding comprises:
encoding, through intra prediction, a depth image of a reference image assigned to the multi-view enhancement layer; and
encoding, through inter-view prediction, a depth image of a neighboring image assigned to the multi-view enhancement layer.

4. The method of claim 1, wherein the encoding comprises encoding, through inter-view prediction, a view image assigned to the multi-view enhancement layer, in view of at least one of a reference image assigned to the base layer and a neighboring image assigned to the stereo layer.

5. The method of claim 1, wherein the encoding comprises encoding, through inter-view prediction, a depth image of a view image assigned to the multi-view extension layer, in view of at least one of a depth image of a reference image assigned to the multi-view enhancement layer and a depth image of a neighboring image assigned to the multi-view enhancement layer.

6. The method of claim 1, wherein the encoding comprises:
converting a resolution of at least one of a reference image assigned to the base layer and a neighboring image assigned to the stereo layer, based on a resolution of a view image assigned to the multi-view extension layer; and
encoding the view image assigned to the multi-view extension layer, in view of at least one of the reference image and the neighboring image of which the resolution is converted.

7. The method of claim 1, wherein the encoding comprises:
converting a resolution of at least one of a depth image of a reference image and a depth image of a neighboring image that are assigned to the multi-view enhancement layer, based on a resolution of a depth image of a view image assigned to the multi-view extension layer; and
encoding the view image assigned to the multi-view extension layer, in view of at least one of the depth image of the reference image and the depth image of the neighboring image of which the resolution is converted.

8. The method of claim 1, wherein
a reference image is assigned to the base layer and a neighboring image is assigned to the stereo layer, the stereo layer has a resolution identical to a resolution of the reference image assigned to the base layer,
a depth image of a reference image assigned to the multi-view enhancement layer has a resolution identical to or different from a resolution of a depth image of a reference image, and a resolution of a depth image of a neighboring image,
a depth image of a neighboring image assigned to the multi-view enhancement layer has a resolution identical to or different from a resolution of a reference image, and a resolution of a neighboring image,
a view image assigned to the multi-view extension layer has a resolution identical to or different from a resolution of a reference image, and a resolution of a neighboring image, and a depth image of the view image assigned to the multi-view extension layer has a resolution identical to or different from a resolution of a depth image of a reference image, and a resolution of a depth image of a neighboring image.

9. The method of claim 1, wherein
the assigning comprises:
assigning, to the base layer, a reference image corresponding to a first view image;
assigning, to the stereo layer, a neighboring image that neighbors the reference image and corresponds to a second view image;
assigning, to the multi-view enhancement layer, a depth image of the reference image and a depth image of the neighboring image; and
assigning, to the multi-view extension layer, a remaining neighboring image, excluding the neighboring image from images neighboring the reference image, and a depth image corresponding to the remaining neighboring image, and
the remaining neighboring image corresponds to at least one image having a view different from views of the first view image and the second view image.

10. The method of claim 1, wherein the encoding comprises generating, through the encoding, an encoded hierarchical bit stream including a base layer stream, a stereo layer stream, a multi-view enhancement layer stream, and a multi-view extension layer stream.

11. An apparatus for encoding an image, the apparatus comprising:
a processor comprising:
a layer assigner to assign at least one view image included in an input image to at least one of a base layer, a stereo layer, a multi-view enhancement layer, and a multi-view extension layer; and
an encoder to hierarchically encode the at least one view image assigned to at least one of the base layer, the stereo layer, the multi-view enhancement layer, and the multi-view extension layer,
wherein the encoding comprises converting a resolution of at least one of a reference image, a neighboring image, a depth image of a reference image, and a depth image of a neighboring image, based on at least one of a resolution of the at least one view image and a resolution of a depth image of the at least one view image, and encoding the at least one view image based on the at least one image of which the resolution is converted.

12. The apparatus of claim 11, wherein the encoder encodes, through inter-view prediction, a neighboring image assigned to the stereo layer, in view of a reference image assigned to the base layer.

13. The apparatus of claim 11, wherein the encoder encodes, through intra prediction, a depth image of a reference image assigned to the multi-view enhancement layer, and encodes, through inter-view prediction, a depth image of a neighboring image assigned to the multi-view enhancement layer.

14. The apparatus of claim 11, wherein the encoder encodes, through inter-view prediction, a view image assigned to the multi-view enhancement layer, in view of at least one of a reference image assigned to the base layer and a neighboring image assigned to the stereo layer.

15. The apparatus of claim 11, wherein the encoder encodes, through inter-view prediction, a depth image of a view image assigned to the multi-view extension layer, in view of at least one of a depth image of a reference image assigned to the multi-view enhancement layer and a depth image of a neighboring image assigned to the multi-view enhancement layer.

16. The apparatus of claim 11, wherein the encoder converts a resolution of at least one of a reference image assigned to the base layer and a neighboring image assigned to the stereo layer, based on a resolution of a view image assigned to the multi-view extension layer, and encodes the view image assigned to the multi-view extension layer, in view of at least one of the reference image and the neighboring image of which the resolution is converted.

17. The apparatus of claim 11, wherein the encoder converts a resolution of at least one of a depth image of a reference image and a depth image of a neighboring image that are assigned to the multi-view enhancement layer, based on a resolution of a depth image of a view image assigned to the multi-view extension layer, and encodes the view image assigned to the multi-view extension layer, in view of at least one of the depth image of the reference image and the depth image of the neighboring image of which the resolution is converted.

18. A method of decoding an image, the method comprising:
receiving an encoded bit stream including at least one of a base layer stream, a stereo layer stream, a multi-view enhancement layer stream, and a multi-view extension layer stream; and
hierarchically decoding the encoded bit stream using at least one processor,
wherein the bit stream was encoded by converting a resolution of at least one of a reference image, a neighboring image, a depth image of a reference image, and a depth image of a neighboring image, based on at least one of a resolution of at least one view image and a resolution of a depth image of at least one view image, and encoding the at least one view image based on the at least one image of which the resolution is converted, and
wherein the decoding comprises restoring the resolution of the at least one image of which the resolution was converted.

19. The method of claim 18, wherein the decoding comprising restoring a two-dimensional (2D) image by decoding the base layer stream based on additional information.

20. The method of claim 18, wherein the decoding comprises restoring a reference image and a neighboring image by decoding the base layer stream and the stereo layer stream.

21. The method of claim 20, wherein the decoding comprises:
generating a depth image of the reference image and a depth image of the neighboring image in view of at least one of the reference image and the neighboring image;
generating at least one virtual view image in view of the reference image and the neighboring image;
generating a depth image of the at least one virtual view image in view of the depth image of the reference image and the depth image of the neighboring image; and
generating a multi-view image by synthesizing the reference image, the neighboring image, the depth image of the reference image, the depth image of the neighboring image, the at least one virtual view image, and the depth image of the at least one virtual view image.

22. The method of claim 20, wherein the decoding comprises:
restoring a depth image of the reference image and a depth image of the neighboring image by decoding the multi-view enhancement layer stream;
generating at least one virtual view image in view of the reference image and the neighboring image;
generating a depth image of the at least one virtual view image in view of the depth image of the reference image and the depth image of the neighboring depth image; and
generating a multi-view image by synthesizing the reference image, the neighboring image, the depth image of the reference image, the depth image of the neighboring image, the at least one virtual view image, and the depth image of the at least one virtual view image.

23. The method of claim 20, wherein the decoding comprises:
restoring a depth image of the reference image and a depth image of the neighboring image by decoding the multi-view enhancement layer stream;
restoring at least one view image assigned to a multi-view extension layer, and a depth image of the at least one view image by decoding the multi-view extension layer stream; and
generating a multi-view image by synthesizing the reference image, the neighboring image, the depth image of the reference image, the depth image of the neighboring image, the at least one view image assigned to the multi-view extension layer, and the depth image of the at least one view image assigned to the multi-view extension layer.

24. The method of claim 19, wherein the additional information comprises at least one of resolution information, information about a number of view images, camera parameter information, and image mode information.

25. An apparatus for decoding an image, the apparatus comprising:
a processor comprising:
a bit stream receiver to receive an encoded hierarchical bit stream including at least one of a base layer stream, a stereo layer stream, a multi-view enhancement layer stream, and a multi-view extension layer stream; and
a decoder to hierarchically decode the encoded bit stream,
wherein the bit stream was encoded by converting a resolution of at least one of a reference image, a neighboring image, a depth image of a reference image, and a depth image of a neighboring image, based on at least one of a resolution of at least one view image and a resolution of a depth image of at least one view image, and encoding the at least one view image based on the at least one image of which the resolution is converted, and
wherein the decoding comprises restoring the resolution of the at least one image of which the resolution was converted.

26. The apparatus of claim 25, wherein the decoder comprises:
a two-dimensional (2D) decoder to restore a 2D image by decoding the base layer stream based on additional information.

27. The apparatus of claim 25, wherein the decoder comprises:
a stereo decoder to restore a reference image and a neighboring image by decoding the base layer stream and the stereo layer stream when additional information included in the encoded bit stream includes a stereo image mode.

28. The apparatus of claim 26, further comprising:
a depth image generator to generate a depth image of the reference image and a depth image of the neighboring image in view of at least one of the reference image and the neighboring image; and a view image synthesizer to generate at least one virtual view image in view of the reference image and the neighboring image, to generate a depth image of the at least one virtual view image in view of the depth image of the reference image and the depth image of the neighboring image, and to restore a multi-view image by synthesizing the reference image, the neighboring image, the depth image of the reference image, the depth image of the neighboring image, the at least one virtual view image, and the depth image of the at least one virtual view image.

29. The apparatus of claim 25, wherein the decoder comprises:
a three-dimensional (3D) decoder to restore a reference image and a neighboring image by decoding the base layer stream and the stereo layer stream, and to restore a depth image of the reference image and a depth image of the neighboring image by decoding the multi-view enhancement layer stream.

30. The apparatus of claim 29, further comprising:
a view image synthesizer to generate at least one virtual view image in view of the reference image and the neighboring image, to generate a depth image of the at least one virtual view image in view of the depth image of the reference image and the depth image of the neighboring image, and to restore a multi-view image by synthesizing the reference image, the neighboring image, the depth image of the reference image, the depth image of the neighboring image, the at least one virtual view image, and the depth image of the at least one virtual view image.

31. The apparatus of claim 25, wherein the decoder comprises:
a 3D decoder to restore a reference image and a neighboring image by decoding the base layer stream and the stereo layer stream, to restore a depth image of the reference image and a depth image of the neighboring image by decoding the multi-view enhancement layer stream, and to restore at least one view image assigned to a multi-view extension layer, and a depth image of the at least one view image by decoding the multi-view extension layer stream when additional information included in the encoded bit stream includes a multi-view image mode.

32. The apparatus of claim 31, further comprising:
a view image synthesizer to generate a multi-view image by synthesizing the reference image, the neighboring image, the depth image of the reference image, the depth image of the neighboring image, the at least one view image, and the depth image of the at least one view image.

33. The apparatus of claim 26, wherein the additional information comprises at least one of resolution information, information about a number of view images, camera parameter information, and image mode information.

34. At least one non-transitory computer-readable medium storing computer-readable instructions that control at least one processor to implement the method of claim 1.

35. At least one non-transitory computer-readable medium storing computer-readable instructions that control at least one processor to implement the method of claim 18.

* * * * *